(12) United States Patent
Gaikwad et al.

(10) Patent No.: US 8,588,696 B2
(45) Date of Patent: Nov. 19, 2013

(54) ADAPTIVE CELLULAR POWER CONTROL

(75) Inventors: Amit Gaikwad, Cupertino, CA (US);
Indranil Sen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 12/794,609

(22) Filed: Jun. 4, 2010

(65) Prior Publication Data

US 2011/0300805 A1    Dec. 8, 2011

(51) Int. Cl.
*H04B 15/00*    (2006.01)

(52) U.S. Cl.
USPC .............. 455/63.1; 455/67.16; 455/67.14; 455/67.11; 455/260; 455/258; 455/41.2; 455/67.13; 455/434; 455/226.1; 455/296; 455/450; 455/553.1; 370/252; 370/338; 370/346; 370/331

(58) Field of Classification Search
USPC ............. 455/41.2, 63.1, 67.13, 67.11, 434, 455/226.1, 296, 450, 553.1, 522, 69; 370/252, 338, 346, 331
See application file for complete search history.

(56) References Cited

U.S. PATENT DOCUMENTS

| | | | |
|---|---|---|---|
| 5,220,332 A * | 6/1993 | Beckner et al. | 342/125 |
| 6,731,908 B2 * | 5/2004 | Berliner et al. | 455/67.11 |
| 7,209,071 B1 * | 4/2007 | Boring | 342/42 |
| 7,450,522 B2 * | 11/2008 | Feder et al. | 370/252 |
| 7,664,465 B2 | 2/2010 | Shen et al. | |
| 7,701,913 B2 | 4/2010 | Chen et al. | |
| 2002/0094786 A1 * | 7/2002 | Berliner et al. | 455/67.4 |
| 2004/0183570 A1 * | 9/2004 | Oka | 327/2 |
| 2005/0135514 A1 * | 6/2005 | Suzuki et al. | 375/345 |
| 2005/0237953 A1 * | 10/2005 | Carrender et al. | 370/278 |
| 2005/0239491 A1 * | 10/2005 | Feder et al. | 455/522 |
| 2006/0001494 A1 * | 1/2006 | Garlepp et al. | 331/2 |
| 2007/0149150 A1 * | 6/2007 | Miyazaki | 455/127.1 |
| 2007/0224936 A1 * | 9/2007 | Desai | 455/41.2 |
| 2007/0275672 A1 * | 11/2007 | Maerzinger et al. | 455/75 |
| 2008/0026718 A1 * | 1/2008 | Wangard et al. | 455/266 |
| 2009/0137206 A1 | 5/2009 | Sherman et al. | |
| 2009/0273531 A1 * | 11/2009 | Ishizuka et al. | 343/750 |
| 2009/0304135 A1 * | 12/2009 | Suzuki et al. | 375/354 |
| 2009/0316667 A1 * | 12/2009 | Hirsch et al. | 370/338 |
| 2009/0318087 A1 * | 12/2009 | Mattila et al. | 455/63.1 |
| 2010/0029204 A1 * | 2/2010 | Gao et al. | 455/41.2 |
| 2010/0098135 A1 | 4/2010 | Eitan | |
| 2010/0137025 A1 * | 6/2010 | Tal et al. | 455/553.1 |

(Continued)

FOREIGN PATENT DOCUMENTS

WO    WO 03/001742    1/2003

*Primary Examiner* — Temesgh Ghebretinsae
*Assistant Examiner* — MD Talukder
(74) *Attorney, Agent, or Firm* — Womble Carlyle Sandridge & Rice LLP

(57) ABSTRACT

A method of mitigating interference in a mobile wireless communication device by adaptively adjusting transmit power levels of a wireless cellular transceiver. A receive signal quality for a wireless non-cellular transceiver that includes interference from signals transmitted by the wireless cellular transceiver is estimated. The wireless non-cellular and wireless cellular transceivers are co-located in the mobile wireless communication device, and both transceivers are active. An actual transmit power of the wireless cellular transceiver is adjusted based on the estimated receive signal quality to a level less than a requested transmit power. The estimation of the receive signal quality and the adjusting of the actual transmit power is periodically repeated. The estimation accounts for operational properties of the wireless cellular and non-cellular transceivers as well as operational characteristics of wireless connections through the transceivers.

17 Claims, 11 Drawing Sheets

(56) References Cited

U.S. PATENT DOCUMENTS

| | | | |
|---|---|---|---|
| 2010/0167661 A1* | 7/2010 | Kluge et al. | 455/67.16 |
| 2010/0167662 A1* | 7/2010 | Kluge et al. | 455/67.16 |
| 2010/0285828 A1* | 11/2010 | Panian et al. | 455/522 |
| 2010/0322287 A1* | 12/2010 | Truong et al. | 375/133 |
| 2011/0003597 A1* | 1/2011 | Budic et al. | 455/450 |
| 2011/0006942 A1* | 1/2011 | Kluge et al. | 342/125 |
| 2011/0134963 A1* | 6/2011 | Saraswat et al. | 375/132 |
| 2011/0136530 A1* | 6/2011 | Deshpande | 455/515 |
| 2011/0183698 A1* | 7/2011 | Hoctor et al. | 455/509 |
| 2011/0221476 A1* | 9/2011 | Nesreen et al. | 327/3 |
| 2011/0300805 A1* | 12/2011 | Gaikwad et al. | 455/63.1 |
| 2011/0312288 A1* | 12/2011 | Fu et al. | 455/88 |
| 2012/0040715 A1* | 2/2012 | Fu et al. | 455/553.1 |
| 2012/0164948 A1* | 6/2012 | Narasimha et al. | 455/63.1 |

* cited by examiner

ADAPTIVE CELLULAR POWER CONTROL

TECHNICAL FIELD

The described embodiments relate generally to wireless mobile communications. More particularly, a method is described for mitigating interference between two or more wireless transceivers in a mobile wireless communication device using adaptive transmit power control.

BACKGROUND OF THE INVENTION

Mobile wireless communication devices, such as a wireless cellular telephone or a wireless enabled computer tablet, can provide a wide variety of communication services including, for example, voice communication, text messaging, internet browsing, and audio/video streaming. Different communication services on mobile wireless communication devices can use one or more different communication protocols that transmit and receive in separate or overlapping bands of radio frequency spectrum. Different bands of radio frequency spectrum are allocated for different services, some strictly licensed to particular wireless operators, while other frequency bands can be open for shared common use. Ideally transmissions in one frequency band do not interfere with the reception of transmissions in another frequency band; however, the advent of mobile wireless communication devices that include multiple wireless transceivers, each configured to operate with a different communication protocol and placed in relatively close proximity to each other in the mobile wireless communication device can result in interference between them. A variety of communication protocols have been developed (and continue to be developed and refined) by different national and international standards organizations including the Global System for Mobile Communications (GSM) and Universal Mobile Telecommunications System (UMTS) protocols by the European Telecommunications Standards Institute (ETSI) and the $3^{rd}$ Generation Partnership Project (3GPP). The protocols can specify which radio frequency bands to use and how to transmit and receive radio frequency signals in the radio frequency bands to access wireless communication networks that offer a variety of services.

Mobile wireless communication devices offer short range connections to wireless accessory devices, medium range connections to wireless network access points, and long range connections to cell towers, thereby providing flexibility and near ubiquity for connecting a user to a wide array of communication services. For example, voice communications can be realized over a 3G communication link using a GSM protocol or using a voice over internet protocol (VoIP) packet protocol through a wireless local area network connection. Some mobile wireless communication devices can support seamlessly transferring a communication link between connections that use different protocols. Several national and international standards organizations develop and specify communication protocols that can enable consistent performance and compatibility between products provided by different manufacturers. While each communication protocol can require that transmissions by mobile wireless communications devices using the protocol be restricted to not transmit above a defined power spectral density mask, i.e. keep radiated transmit power below certain levels across different radio frequency bands, current mobile wireless communication devices include receivers capable of detecting radio frequency signals at very low power levels. With a relatively high power transmitter located close to a sensitive receiver in the same mobile wireless communication device, providing adequate isolation between them can prove quite challenging.

Isolation between a transmitter and a receiver co-located in the same mobile wireless communication device can use specific antenna design, shielding, filtering and placement to minimize receiving interfering radio frequency power in one receiving antenna from another transmitting antenna. Current mobile wireless communication devices can be quite compact in size, and the maximum physical distance possible on such small devices between a transmitter and receiver can limit the amount of radiated radio frequency power loss resulting from antenna placement. Thus there exists a need for a method to mitigate interference between radio frequency transceivers placed in the same mobile wireless communications device.

SUMMARY OF THE DESCRIBED EMBODIMENTS

This paper describes various embodiments that relate to methods to mitigate interference between wireless cellular and non-cellular transceivers in a mobile wireless communication device. A method to reduce interference between a wireless cellular transmitter and a wireless non-cellular receiver in a mobile wireless communication device based on estimating interference into the wireless non-cellular receiver and adjusting transmissions by the wireless cellular transmitter is described.

In one embodiment a method of mitigating interference in a mobile wireless communication device includes at least the following steps. A receive signal quality for the wireless non-cellular transceiver that includes interference from signals transmitted by the wireless cellular transceiver is estimated. The wireless non-cellular and wireless cellular transceivers are co-located in the mobile wireless communication device, and both transceivers are active. An actual transmit power of the wireless cellular transceiver is adjusted based on the estimated receive signal quality to a level less than a requested transmit power. The estimation of the receive signal quality and the adjusting of the actual transmit power is periodically repeated. In a representative embodiment, the estimation accounts for properties of the transmitter of the wireless cellular connection and the receiver of the wireless non-cellular connection as well as operational characteristics of the wireless cellular and wireless non-cellular connections through the transceivers.

In another embodiment, a mobile wireless communication device comprises a first transceiver that receives signals through a wireless non-cellular connection, a second transceiver that transmits signals through a wireless cellular connection, and a control processor coupled to the first and second transceivers. The control processor mitigates interference in the mobile wireless communication device. The control processor estimates a performance impact to signals received by the first transceiver from signals transmitted by the second transceiver. The control processor adjusts an actual transmit power of the second transceiver based on the performance impact estimation. The actual transmit power of the second transceiver is less than a requested transmit power for an uplink of the wireless cellular connection. The estimation and transmit power adjustment is repeated periodically while both the wireless non-cellular and wireless cellular connections are active. In a representative embodiment, the estimation accounts for properties of the wireless cellular transmitter and the wireless non-cellular receiver as well as operational characteristics of the wireless cellular transceiver.

In yet another embodiment, a computer readable medium for storing computer program code executable by a processor for mitigating interference in a mobile wireless communication device is described. The computer readable medium includes non-transitory computer program code for estimating a performance impact to signals received by a first transceiver of the mobile wireless communication device through a wireless non-cellular connection from signals transmitted by a second transceiver of the mobile wireless communication device through a wireless cellular connection. The computer readable medium further includes non-transitory computer program code for adjusting an actual transmit power of the second transceiver based on the performance impact estimation. The actual transmit power of the second transceiver is less than a requested transmit power for an uplink of the wireless cellular connection. The computer readable medium also includes non-transitory computer program code for periodically repeating the estimating and adjusting while the wireless non-cellular and wireless cellular connections are active.

In still another embodiment, an apparatus for adjusting transmit signals output by a cellular transceiver in a mobile wireless communication device is described. The apparatus includes at least means for estimating a performance impact to signals received by a non-cellular transceiver of the mobile wireless communication device from signals transmitted by the cellular transceiver. The apparatus also includes means for determining a requested transmit power level for the transmit signals output by the cellular transceiver, the requested transmit power level at least partially based on messages received from a network subsystem to which the cellular transceiver connects. The apparatus further includes means for adjusting an actual transmit power level of the transmit signals to a value different than the requested transmit power level when the performance impact to signals received by the non-cellular transceiver exceeds a threshold. Additionally, the apparatus includes means for repeating the estimating, determining and adjusting periodically while the cellular and non-cellular transceivers are active.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
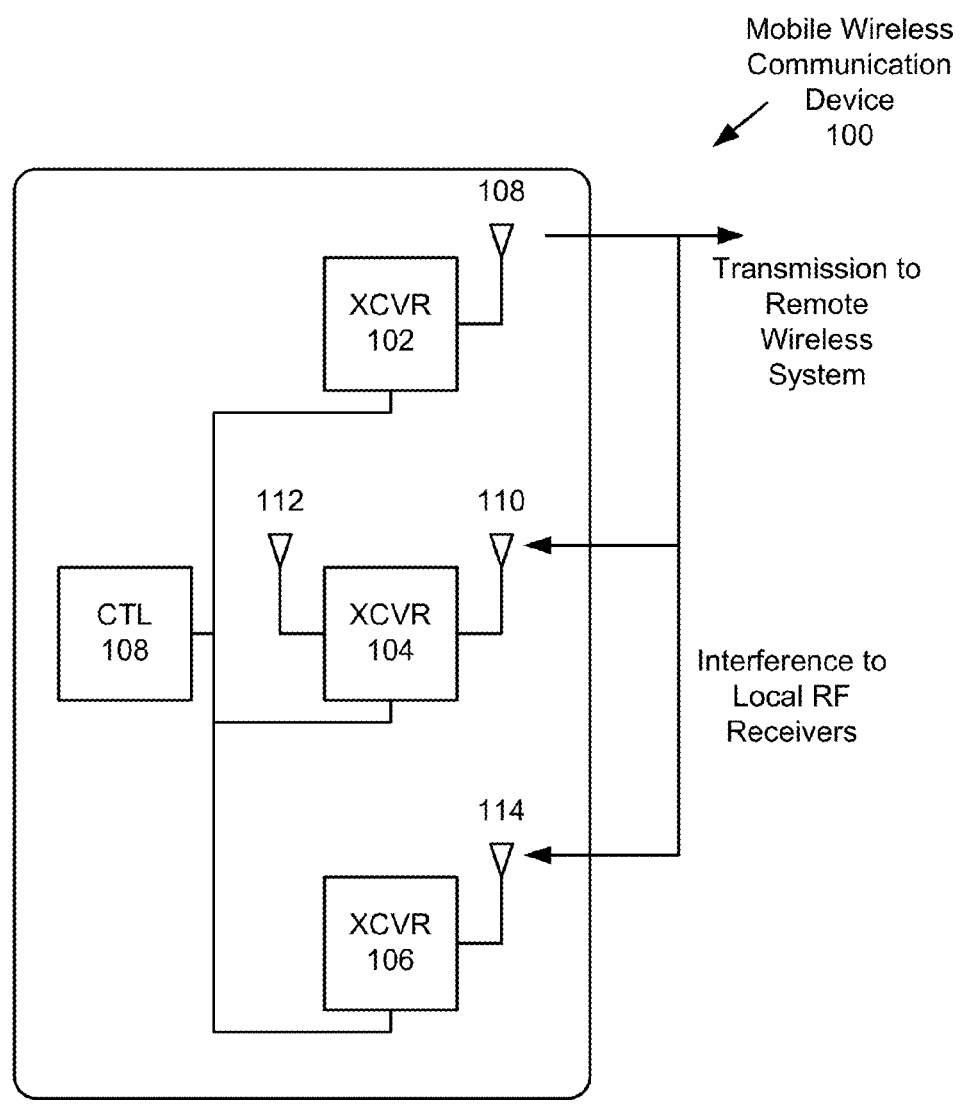
FIG. 1 illustrates a mobile wireless communication device that includes multiple radio frequency transceivers.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices, such as a wireless cellular telephone or a wireless enabled tablet computer, can provide a wide array of communication services including, for example, voice communication, text messaging, internet browsing, and audio/video streaming. Different communication services offered on mobile wireless communication devices can use one or more different communication protocols that transmit and receive in separate or overlapping bands of radio frequency spectrum. Contemporary mobile wireless communication devices can operate using several different radio frequency transmitters and receivers simultaneously, each transmitter potentially interfering with one or more of the receivers. The performance of an individual radio frequency receiver, as measured by its data rate throughput or its packet error rate, can be degraded due to interference from a co-located transmitter that outputs radio frequency power in the same (in-band) or different (out-of-band) radio frequency bands in which the radio frequency receiver can operate. Current mobile wireless communication devices can utilize multiple radio frequency transceivers (transmitter and receiver pairs) situated in close physical proximity in the device, and limitations on the form factor for these mobile wireless communication devices can limit the amount of isolation achievable between different radio frequency transceivers. Thus, optimal system performance of radio frequency reception in a mobile wireless communication device can depend on intelligent interference detection and radio frequency power spectrum management through transmit power control.

Mobile wireless communication devices can include control units that monitor and assess the operational states of different wireless communication transceivers contained therein. When two or more wireless communication transceivers are active simultaneously, whether transmitting or receiving, the control unit can determine whether one transceiver's radiated output power can interfere with a second transceiver's reception and decoding of data. An estimation of the performance impact of interference between transceivers in the mobile wireless communication device can depend on static parameters, such as knowledge of placement and design of the physical components used for radio transmission and reception in the mobile wireless communication device. The estimation can also depend on operational characteristics of the transceivers used, as well as on dynamic parameters that account for the specific operational state and connection of the transceivers. A low data rate packet connection with automatic retransmission, for example, can be influenced differently by radio frequency interference than a high data rate streaming video connection. A control unit in the mobile wireless communication device can monitor the wireless transceivers regularly to manage their transmissions to minimize interference while maintaining a desired level of quality of service for active connections.

FIG. 1 illustrates a mobile wireless communication device 100 that includes three wireless transceivers (XVCR) 102/104/106. The first transceiver 102 can transmit a wireless signal through an antenna 108 to a remotely located wireless system. In a representative embodiment, the first transceiver 102 can be a wireless cellular Global System for Mobile Communications (GSM) transceiver that transmits to a base transceiver station (BTS) or a wireless cellular Universal Mobile Telecommunications System (UMTS) transceiver that transmits to a Node B. As the remotely located wireless system can be at a distance from the mobile wireless communication device 100, the transmitted signal from the transceiver 102 can have significant radio frequency transmit power levels. The second and third transceivers 104/106 in the mobile wireless communication device 100 can receive a part of the signals transmitted by the first transceiver 102, including when the transceivers 102/104/106 operate in non-overlapping radio frequency bands. In a representative embodiment, the second transceiver 104 can be a wireless local area network (WLAN) transceiver 104, and the third transceiver can be a Bluetooth (BT) transceiver 106 (which can collectively be referred to herein as wireless non-cellular transceivers). All three transceivers 102/104/106 can be connected to a control unit 108. While representative embodiments using GSM, WLAN and BT transceivers are described herein, no particular limitation is implied for the claimed embodiments. Other wireless communication transceivers can also generate interference among each other and therefore benefit from interference mitigation through transmit power control as disclosed herein.

Wireless cellular transceivers can provide long range connections to cell towers located up to several kilometers away, while WLAN and Bluetooth transceivers can provide medium range (less than 100 meter) and short range (less than 10 meter) connections respectively. Each of the transceivers 102/104/106 in the mobile wireless communication device 100 can include processing units that convert digital data into analog signals to transmit out from an antenna to remotely located wireless systems (not shown). The transceivers 102/104/106 can also process analog signals received from the remotely located wireless systems into digital data that can be further processed and output to a user of the mobile wireless communication device 100. Each transceiver in the mobile wireless communication device 100 can include its own antenna system that radiates and captures radio frequency (RF) energy designed for one or more specific wireless communication protocols that use certain ranges (bands) of radio frequency spectrum. For example, in representative embodiments, the first transceiver 102 can be a wireless cellular GSM transceiver and can use bands of RF spectrum near 850, 900, 1800 or 1900 MHz, while the second transceiver 104 can be a WLAN transceiver and can use RF bands near 2.4 or 5 GHz. The third transceiver 106 can be a BT transceiver 106 and can also use a range of RF spectrum near 2.4 GHz. The nominal "in-band" RF spectrum transmitted by the first transceiver 102 can be restricted to a range of radio frequencies that does not overlap the RF spectrum received by the second transceiver 104 and the third transceiver 106; however, significant "out-of-band" RF power can be transmitted outside of the nominal RF spectrum and can impact the performance of nearby RF transceivers. The radio frequency power transmitted by the first transceiver 102 to a remote wireless system located at a significant distance (several km away) from the mobile wireless communication device 100 can be output at a relatively high level and therefore include detectable transmit power that can leak into and interfere with reception of RF signals by the local transceivers 104/106.

A primary protection of the second and third transceivers 104/106 in the mobile wireless communication device 100 can be isolation between the first transceiver antenna 108 and the second/third transceiver antennas 110/114. Small form factors for the mobile wireless communication device 100, however, can limit the amount of isolation possible between the antennas. Newer communication protocols, such as multiple-input multiple-output (MIMO) modes of IEEE 802.11n, can also use multiple antennas, such as shown for the second transceiver 104 with two antennas 110/112. Multiple antennas can make physical isolation between antennas used by different communication protocols even more difficult in a smaller mobile wireless communication device 100. To minimize interference, the first transceiver 102 can include transmit filtering that limits transmitted power in "out of band" frequency bands; however, the level of filtering required to eliminate interference into nearby receivers can be impractical to realize. For example, a GSM transceiver can transmit at levels between approximately 0 and +33 dBm "in band" (i.e. within the nominal transmit frequency spectrum), while a WLAN transceiver and a BT transceiver can detect received signals at a level of −98 dBm and −91 dBm respectively (within their own band frequency spectrum, which is "out of band" with respect to the GSM transceiver). Transmit frequency spectrum roll-off between the "in band" and "out of band" frequency spectra and additional transmit filtering by the GSM transceiver can provide more than 70 dB of isolation, but an additional of approximately 30 to 70 dB of isolation can be required to lower the GSM transmit signal to a level that does not impact the performance of highly sensitive WLAN and BT receivers. Such large additional isolation can be difficult to achieve in mobile wireless communication devices with relatively small form factors.

Figure 2:
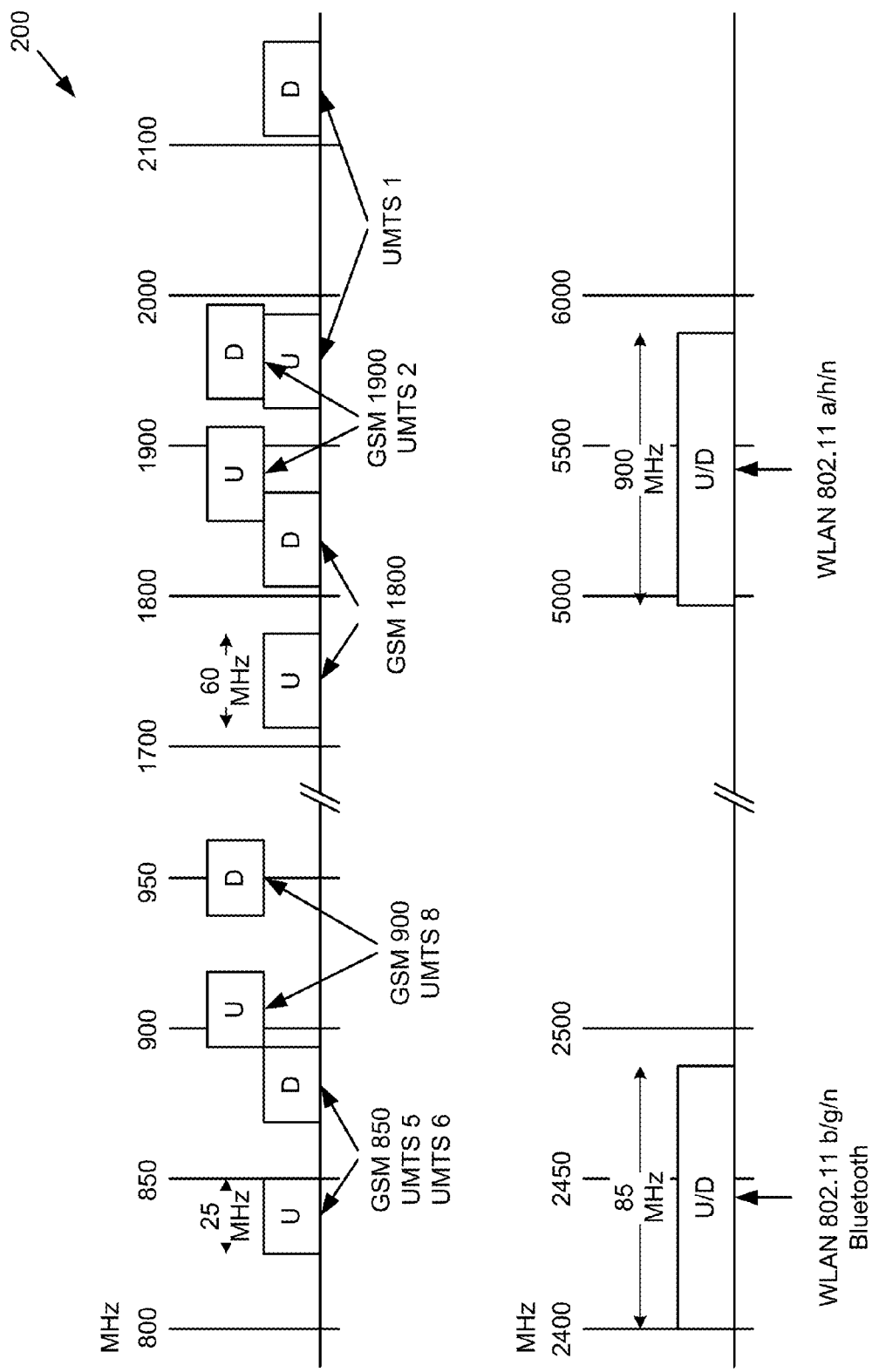
FIG. 2 illustrates radio frequency band allocations used for several different standardized wireless communication protocols.
Figure 3:
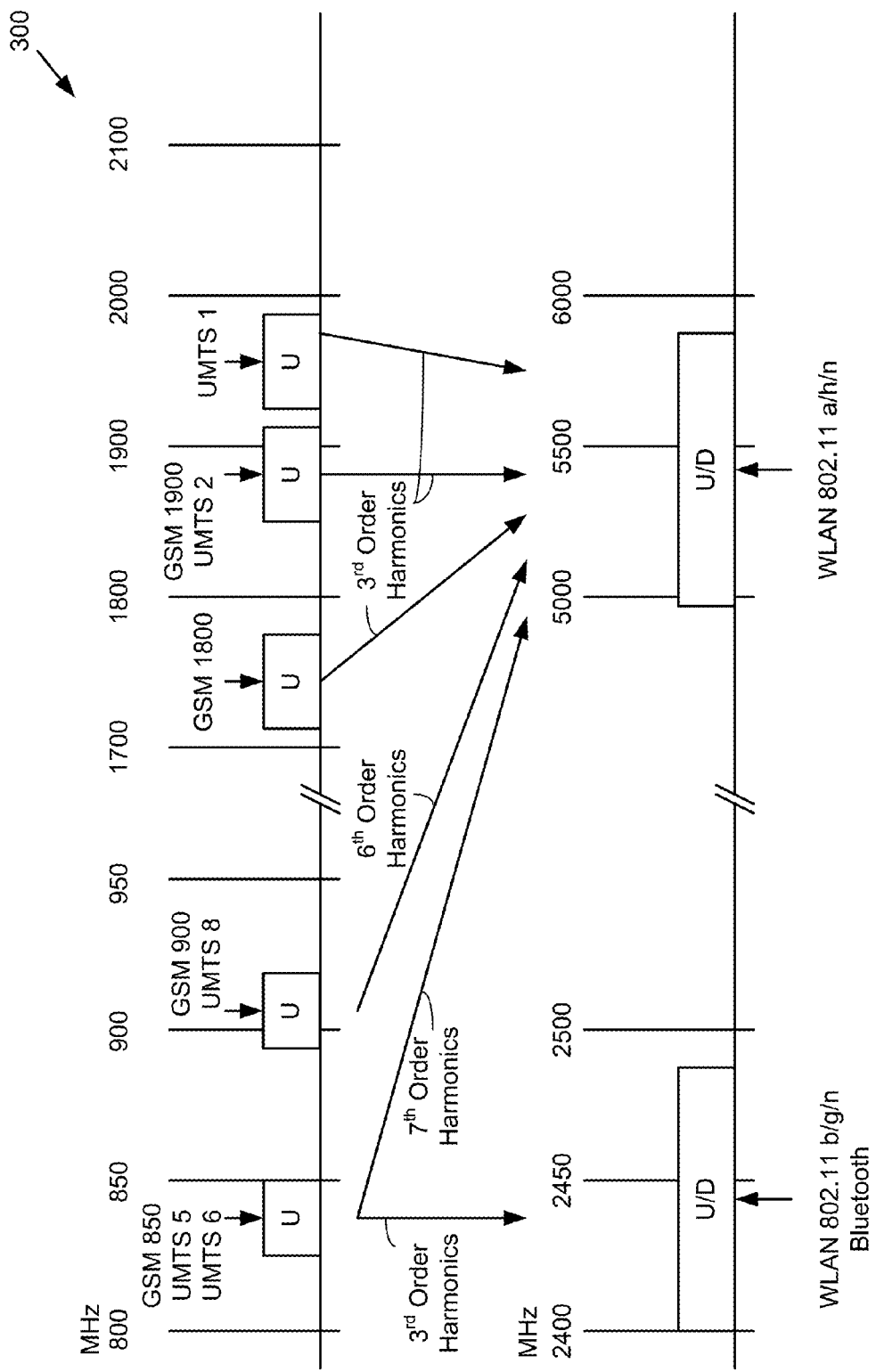
FIG. 3 illustrates higher order harmonic radio frequency interference from lower radio frequency bands of wireless cellular mobile transmissions into higher radio frequency bands used by Bluetooth and wireless local area network receivers.

FIG. 2 illustrates several different frequency bands that can be used by third generation (3G) GSM and UMTS (Universal Mobile Telecommunications System) communication protocols. GSM can operate in four distinct pairs of frequency bands at approximately 850, 900, 1800 and 1900 MHz. Each pair of frequency bands near 850 and 900 MHz include a first 25 MHz band for communication from the mobile wireless communication device 100 to a BTS in the "uplink" direction and a second 25 MHz band for communication to the mobile wireless communication device 100 from the BTS in the "downlink" direction. Each 25 MHz frequency band can be further divided into 124 separate frequency channels having a nominal bandwidth of 200 kHz each. When transmitting to a BTS, a mobile wireless communication device 100 can periodically send bursts of radio frequency energy by modulating a frequency carrier in one of the 124 uplink frequency channels. Third order harmonics of the transmitted GSM uplink signal can fall within the 2.4 GHz frequency band that spans a bandwidth of approximately 85 MHz used by the WLAN and BT transceivers 104/106 in the same mobile wireless communication device 100. (A third order harmonic of a transmit signal centered at 825 MHz can be centered at 3×825=2475 MHz.) The third order harmonics of the GSM uplink signal can be sufficiently high to interfere with reception of WLAN or BT signals in the WLAN/BT transceivers. (Common WLAN communication protocols include 802.11 b/g/n that use the 2.4 GHz band and 802.11 a/h/n that use the 5 GHz band as indicated in FIG. 2.) As with a GSM 850 transmitter, higher order harmonics can be generated by transmitters in the GSM transceiver 102 (or a UMTS transceiver) that use frequency channels in the GSM 900, GSM 1800 and GSM 1900 frequency bands. For example, seventh order harmonics of GSM frequency channels near 825 MHz and third order harmonics of GSM frequency channels near 1800 MHz and 1900 MHz can interfere with WLAN signals using the 5 GHz frequency band. (7×825=5775 MHz, 3×1800=5400 MHz, 3=1900=5700 MHz). FIG. 3 illustrates examples in which several different higher order harmonics generated by GSM/UMTS bands can interfere with reception of signals in the 2.4 GHz WLAN/BT frequency band and in the 5 GHz WLAN frequency band.

Figure 4:
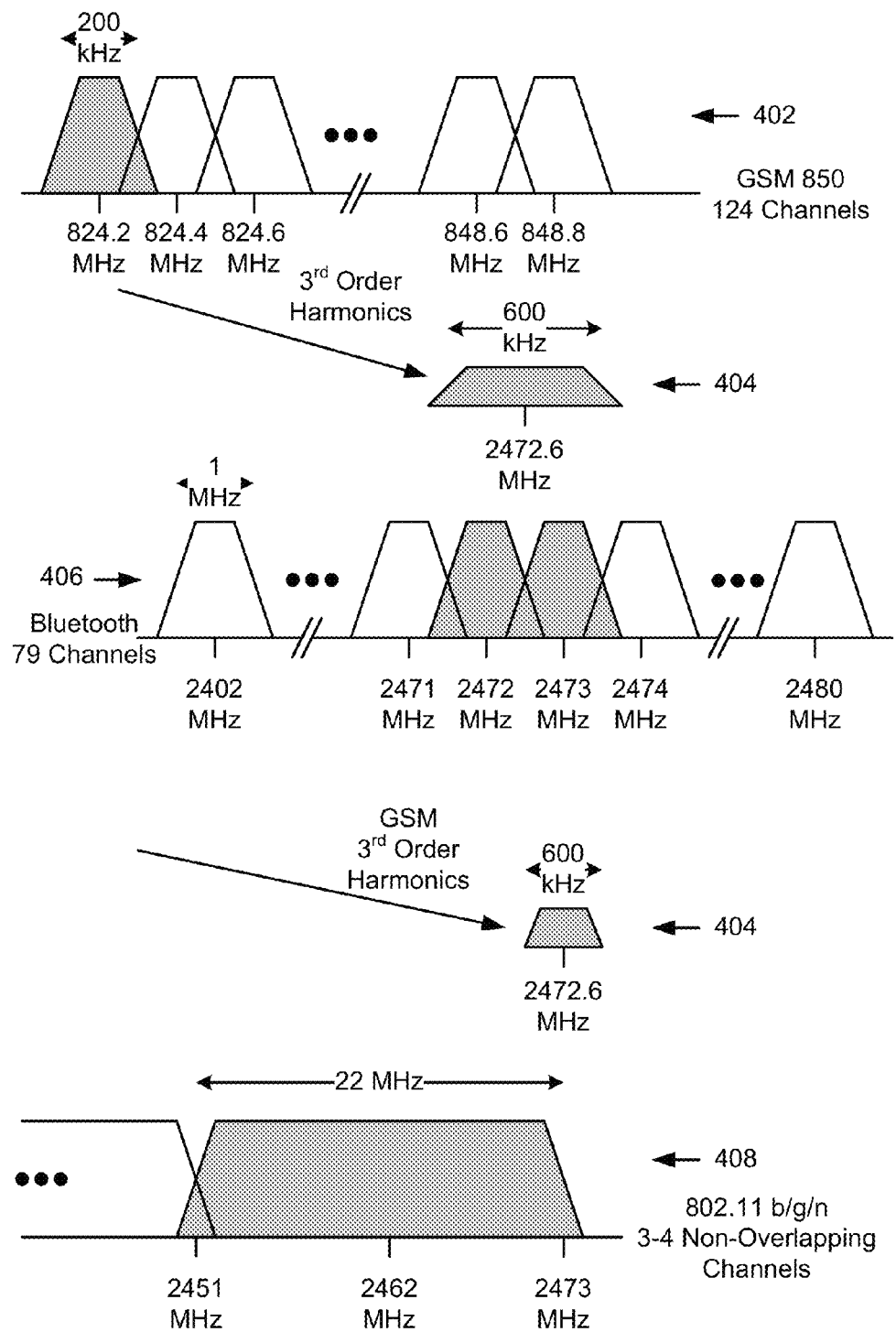
FIGS. 4 and 5 illustrate representative radio frequency interference between a mobile wireless cellular communication transmitter and one or more Bluetooth and wireless local area network receivers.
Figure 5:
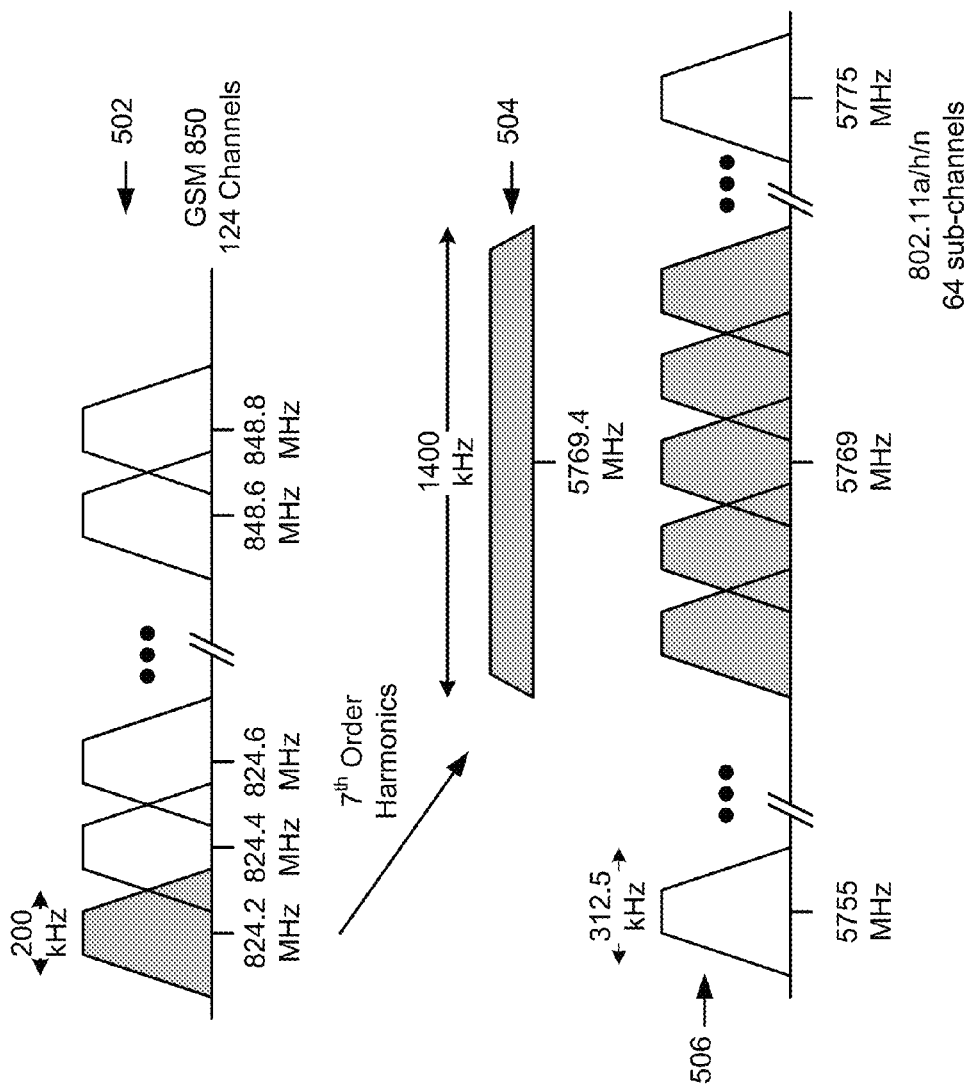

FIGS. 4 and 5 provide additional specific illustrations of interference that can be generated by a GSM transmitter into co-located Bluetooth and WLAN receivers in a mobile wireless communication device 100. The GSM 850 uplink frequency band 402 can include 124 different RF channels, each RF channel centered at a different carrier frequency and having a nominal bandwidth of 200 kHz. A GSM transmitter outputting energy on the frequency channel centered at 824.2 MHz can produce third order harmonics 404 having a nominal bandwidth of 600 kHz (three times wider) centered at 2472.6 MHz (three times higher in frequency). These third order harmonics can be significantly lower in power than the primary frequency band of the GSM 850 transmit signal (due to a combination of transmit frequency roll-off, transmit filtering and radiated power loss), but the third order harmonics can be comparable or higher in power than Bluetooth signals received in the 2.4 GHz band 406 from a remote wireless accessory device.

The Bluetooth communication protocol specifies 79 independent RF channels, each RF channel spaced 1 MHz apart from 2402 MHz to 2480 MHz. A Bluetooth transmitter can frequency hop between the 79 different channels on successive transmission bursts, thereby providing a measure of frequency diversity that avoids continuous interference transmitting at a fixed frequency. Only for a fraction of transmit time can the Bluetooth transmitter use each RF channel, and thus transmissions on other RF channels can be received free from that particular interference. As shown in FIG. 4, the third order harmonics 404 of the GSM 850 transmit channel can interfere with Bluetooth channels at 2472 and 2473 MHz. The Bluetooth transceiver 106 can observe this interference over time and adaptively avoid using an RF channel that receives such interference; however, Bluetooth transmissions received before adaptively moving away from these RF channels can be corrupted. A system that marks the Bluetooth RF channels prone to interference as "unsuitable" for communication based on an estimation of the interference that can be generated by the GSM transmitter (for example, before the Bluetooth receiver detects the interference) can provide improved performance in mobile communication devices that use both GSM and Bluetooth transceivers simultaneously. Anticipating that interference can occur between transceivers in the same mobile wireless communication device and mitigating the potential interference before it occurs can increase throughput and stability of RF reception. As shown in FIG. 4, The GSM third order harmonics 404 can also interfere with a portion of the 802.11 b/g/n frequency band 408 that occupies the 22 MHz wide frequency range between 2451 MHz and 2473 MHz.

As illustrated by FIG. 5, higher $7^{th}$ order harmonics of a GSM transmit signal can produce a "7 times" wider bandwidth interference signal 504 that can interfere with wireless local area network protocols that use the 5 GHz frequency band. The GSM 850 channel at 824.2 MHz can produce a seventh order harmonic 504 at 5769.4 MHz with a bandwidth of 1400 kHz. The IEEE 802.11 a/h/n protocol specifies a 20 MHz region of bandwidth between 5755 MHz and 5775 MHz that can include 64 different parallel RF sub-channels, each occupying 312.5 kHz of bandwidth. The 64 RF sub-channels can be transmitted simultaneously using an orthogonal frequency division multiplexing (OFDM) modulation scheme. The 1400 kHz wide seventh order harmonics 504 from the GSM 850 transmit signal can interfere with five of these parallel sub-channels in the 5 GHz WLAN frequency band. Unlike the individual Bluetooth sub-channels that can be selectively disabled, all of the 64 parallel sub-channels in the 802.11 a/h/n transmit spectrum can be used simultaneously. To avoid higher order harmonic interference from the GSM transmitter, the 802.11 a/h/n connection can shift all sub-channel frequencies entirely to a different 20 MHz wide band of spectrum. (For example shift from using the 5755 to 5775 MHz frequency band to using the 5735 to 5755 MHz frequency band.) Thus, a relatively narrow band of interference (1400 kHz wide) from a GSM transmitter (200 kHz wide) can result in an undesirable non-use of a large band (20 MHz wide) of wireless network radio frequency spectrum, most of which did not receive interference.

Figure 6:
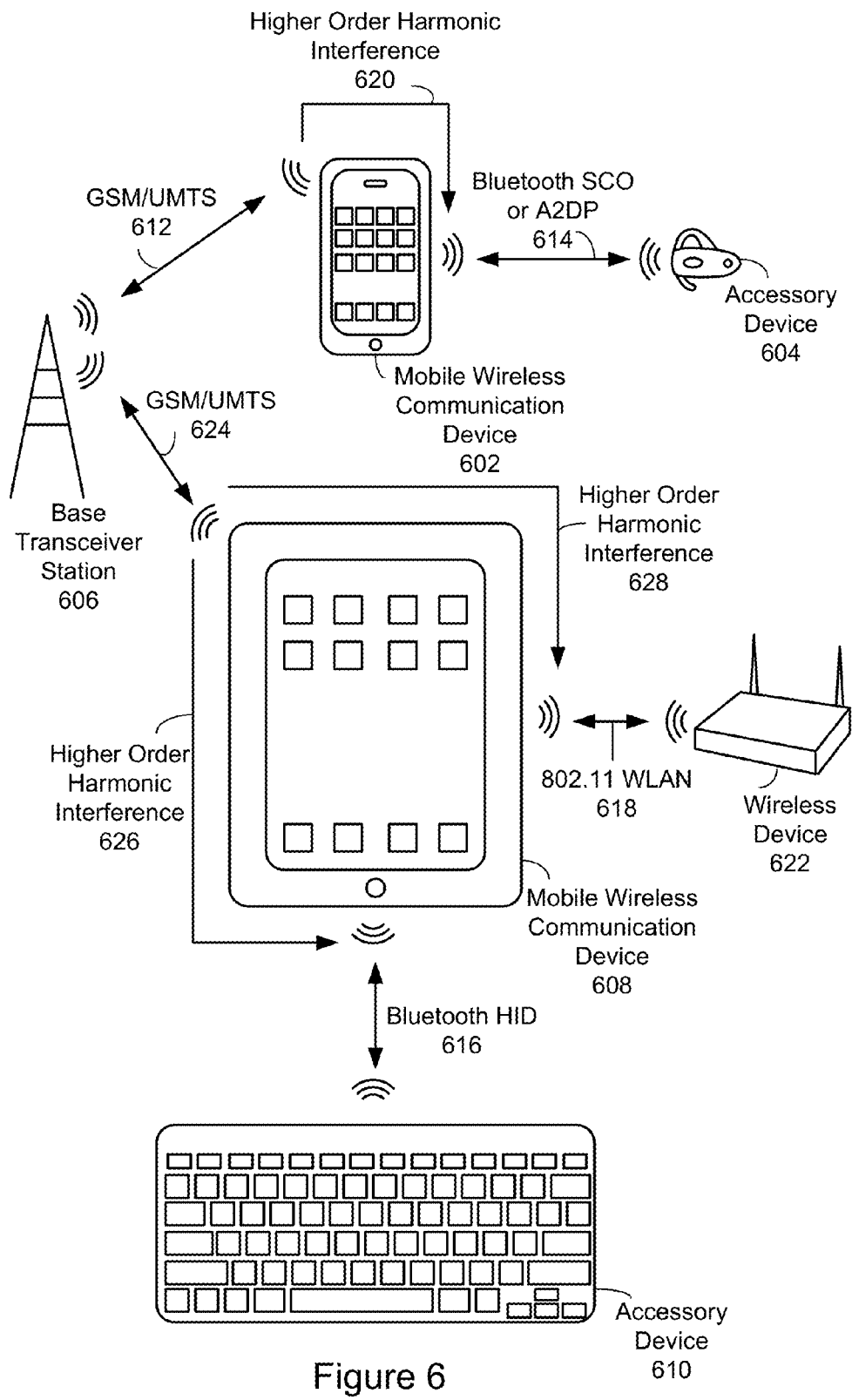
FIG. 6 illustrates two representative mobile wireless communication devices connected simultaneously to several wireless systems that use different wireless communication protocols.

FIG. 6 illustrates two mobile wireless communication devices 602/608 that can communicate using multiple RF communication protocols in representative typical use scenarios. Mobile wireless communication device 602 can connect to a base transceiver station 606 through a GSM/UMTS link 612 and simultaneously connect to an accessory device 604 through a Bluetooth link 614. The GSM/UMTS link 612 can be used for real time voice communication, and the Bluetooth link 614 can be configured to operate in a "synchronous connection-oriented" (SCO) mode to communicate the voice signals to and from the accessory device 604. The Bluetooth link 614 can also be configured to operate using an "advanced audio distribution profile" (A2DP) to communicate audio signals with the accessory device 604. The Bluetooth SCO or A2DP link 614 can typically be used for time sensitive data transfer, such as for a voice or real-time audio connection, and no error correction or re-transmission can be applied. Thus the Bluetooth SCO or A2DP link 614 from the accessory device 604 can be susceptible to higher order harmonic interference 620 generated by the GSM/UMTS 612 link at the mobile wireless communication device 602. Interference into a Bluetooth receiver in the mobile wireless communication device 100 can be perceived by a user as audible noise in the real time voice communication.

Performance of the Bluetooth SCO or A2DP link 614 between the mobile wireless communication device 602 and the accessory device 604 can be measured using a standardized audio quality metric known as a "mean opinion score" (MOS) or can be estimated by a simulation known as a perceptual evaluation of speech quality (PESQ) score. MOS values and PESQ scores can be represented on a scale from 1 (worst) to 5 (best) with an acceptable quality value set at a certain threshold, e.g. >3.7 can be considered adequate. An automated assessment of audio quality under different interference scenarios between two transceivers in the mobile wireless communication device 602 can be tested. Different transmit carrier frequencies and transmit power levels for the GSM/UMTS signal and different path losses for the Bluetooth SCO or A2DP signal can be assessed for a given mobile wireless communication device design to determine the extent of RF interference between the transceivers. The mobile wireless communication device 602 used for handheld voice communication can be relatively small in size, and thus the transmitter for the GSM/UMTS link 612 can be close to the receiver for the Bluetooth SCO or A2DP link 614, thus prone to interference.

The multi-functional mobile wireless communication device 608 illustrated in FIG. 6 shows two different possible interference paths that can typically occur between different transceivers in the device. As with the handheld mobile wireless communication device 602, the mobile wireless communication device 608 can communicate with the base transceiver station 606 through a GSM/UMTS link 624. The GSM/UMTS link 624 can cause higher order harmonic interference 626 with a Bluetooth connection 616 to an accessory device 610, e.g. a keyboard, and also generate higher order harmonic interference 628 into an 802.11 wireless local area network connection (WLAN) 618 to a wireless device 622, such as a WLAN access point. The Bluetooth connection 616 can use a "human interface device" (HID) profile with an asynchronous connectionless link (ACL) in place of the Bluetooth SCO or A2DP link 614 shown for the mobile wireless connection device 602. The Bluetooth HID link 616 between the keyboard accessory device 610 and the mobile wireless communication device 608 can be tested for higher order harmonic interference 626 from transmissions by the GSM/UMTS link 624 by counting the number of incorrectly received data packets, or similarly the number of keystrokes missed. The performance of the Bluetooth HID link 616 can be tested using different Bluetooth transmit power levels (e.g., to simulate different distances between the mobile wireless communication device 608 and the accessory device 610) and different GSM/UMTS transmit power levels against a reference Bluetooth HID connection with no interference present. A desired performance level of the Bluetooth HID link 616 when interference occurs can be based on a threshold determined by comparing against performance in which there is no interference.

Figure 7:
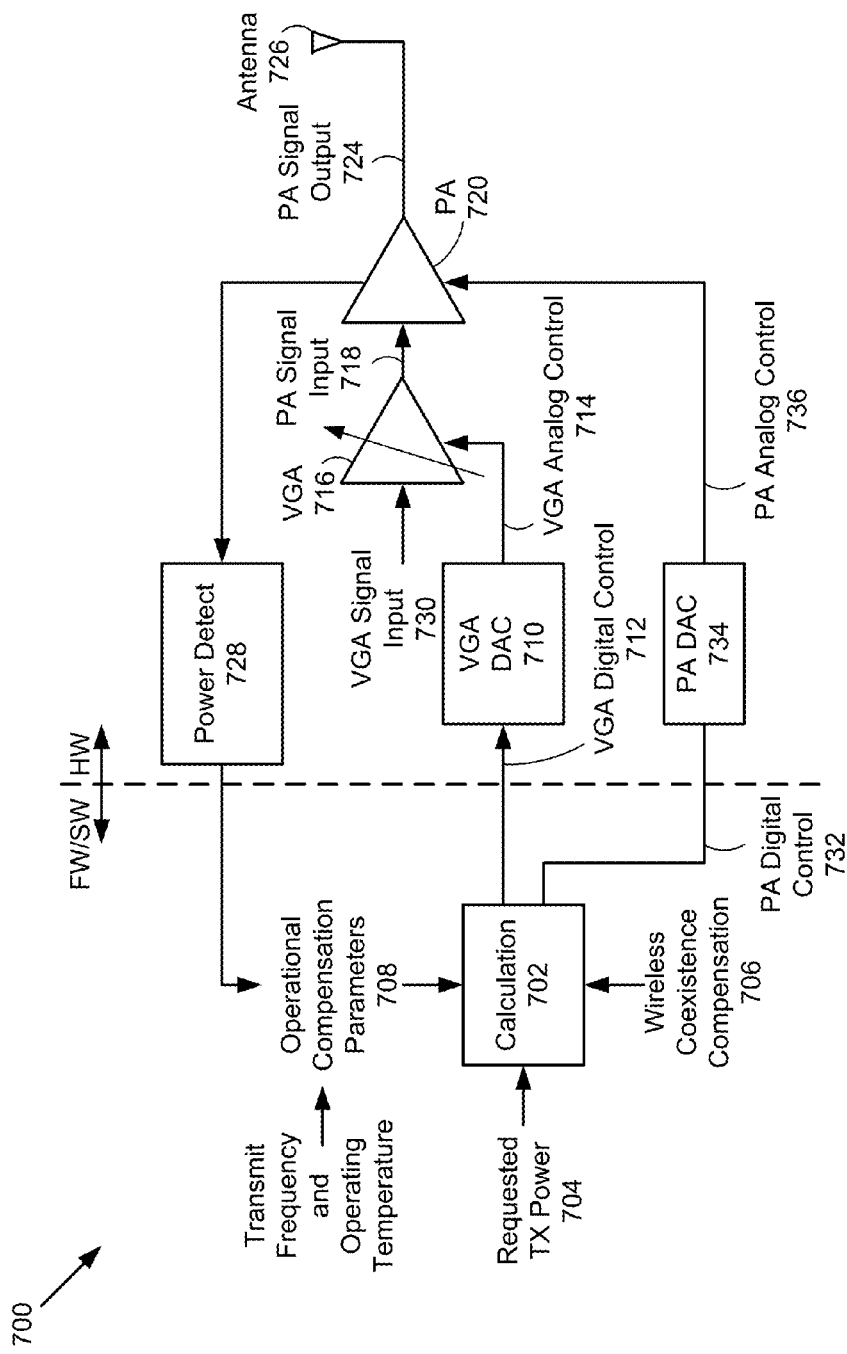
FIG. 7 illustrates portions of a wireless cellular transmitter including transmit power control.

FIG. 7 illustrates representative analog front end (AFE) transmit circuitry 700 that includes adaptive power control for a wireless cellular transceiver that can be located in a mobile wireless communication device, such as mobile devices 602 and 604 shown in FIG. 6. A calculation unit 702 can accept a requested transmit (TX) power 704 with which to configure the AFE circuitry 700. The requested TX power 704 can be communicated to the wireless cellular transceiver from a remote wireless system to which the wireless cellular transceiver is connected. For example, the base transceiver station 606 shown in FIG. 6 can request a specific transmit power level for the GSM/UMTS connection 612 between the base transceiver station 606 and the mobile wireless communication device 602 and request another specific transmit power level for the GSM/UMTS connection 624 between the base transceiver station 606 and the mobile wireless communication device 608. By requesting different transmit power levels from different wireless cellular transceivers located at different distances away, the base transceiver station 606 can seek to equalize signal levels received at the base transceiver station 606 to a similar range.

Standardized communication protocols can allow a variance of the actual transmit power level by the wireless cellular transceiver from the requested transmit power level. For example, GSM communication protocols allow a wireless cellular transceiver's actual transmit power level to vary up to +3 dB higher or −3 dB lower than the requested transmit power level. UMTS communication protocols allow a variation of +1.5 dB higher or −3 dB lower than a maximum transmit power level. The requested power level 704 indicated in FIG. 7 can be calculated at the wireless cellular transceiver based on one or more messages received from the base transceiver station 606. The messages can include indications of a desired transmit level such as a power control level (PCL) as used in GSM systems or through a series of transmit power control (TPC) commands as used in UMTS systems. The power control indications sent by the base transceiver station 606 can be relative values, incremental values, or absolute transmit power level values. For any of these cases, the base transceiver station 606 can request a transmit power level from the mobile wireless communication device directly or indirectly, and the calculation unit 702 can modify the requested transmit power 704 through computations at the mobile wireless communication device.

The calculation unit 702 can adjust the transmit power of the AFE 700 by outputting one or more digital control values, including a variable gain amplifier (VGA) digital control 712 value and a power amplifier (PA) digital control 732 value. A transmit power amplifier (PA) 720 can provide a final stage of amplification of transmitted analog signals before coupling a PA signal output 724 to a radiating wireless antenna 726. The gain of the transmit PA 720 can be controlled by a PA analog control signal 736 output by a PA digital to analog converter (DAC) 734 based on the PA digital control 732. Analog control of the PA can include varying control voltages and/or bias currents into the transmit PA 720. A particular combination of bias voltage and bias current input to the transmit PA 720 can result in a specific output transmit power level for the PA signal output 724. The transmit PA 720 can also include digital controls (not shown) such as a mode control for setting a high output power range or a low output power range of values. Typically, analog control of the gain of a power amplifier such as transmit PA 720 can use relatively few coarsely spaced steps.

Finer control of the amplification of transmitted signals in a wireless transceiver can be accomplished by including a variable gain amplifier (VGA) 716 before the transmit PA 720. The VGA 716 can provide a first stage of amplification with fine gain control generating a PA signal input 718 from a VGA signal input 730. The amount of amplification by the VGA 716 can be controlled through a VGA analog control signal 714 generated by a VGA DAC 710 from a VGA digital control signal 712 output by the calculation unit 702. The VGA digital control signal 712 can be calculated by combining the requested TX power 704 with operational compensation parameters 708 that account for operational variability such as transmit frequency, component temperature and detected transmit power levels. The requested TX power 704 for a wireless cellular transceiver can also be adjusted based on an estimation of wireless interference by radiated wireless transmit signals generated from the PA signal output 724 into a co-located wireless non-cellular transceiver. In representative embodiments, the amplifiers and DACs can be implemented in hardware, while the amplifier digital control signal calculations can be implemented in firmware or software on programmable units. Programmable units can include configurable hardware such as field programmable gate arrays (FPGA), digital signal processing cores (DSPs), reduced instruction set processing cores, or other programmable cores well known in the art.

Figure 8:
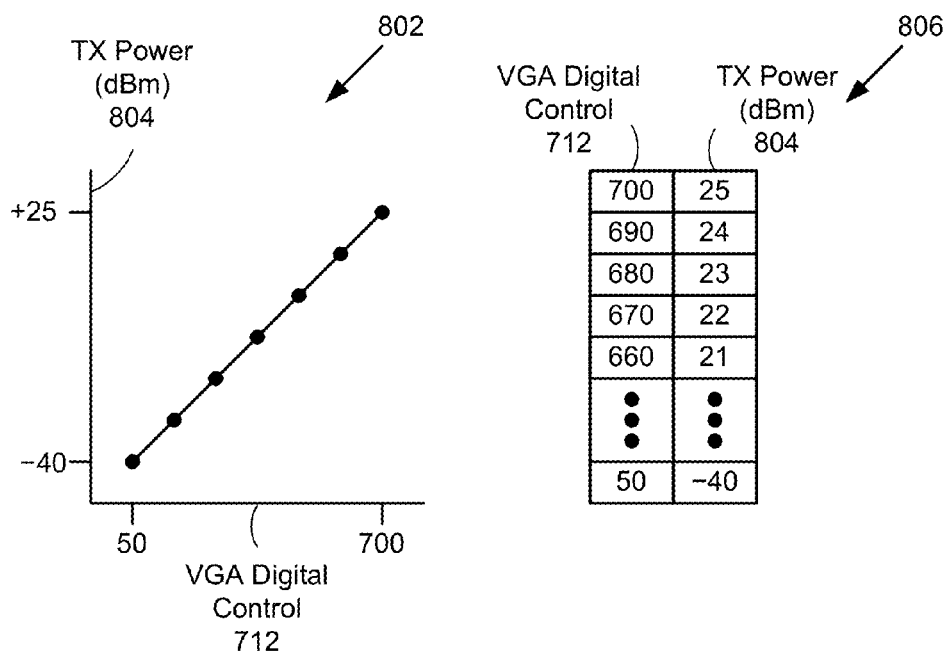
FIGS. 8 and 9 illustrate representative tables for transmit power control.
Figure 8:
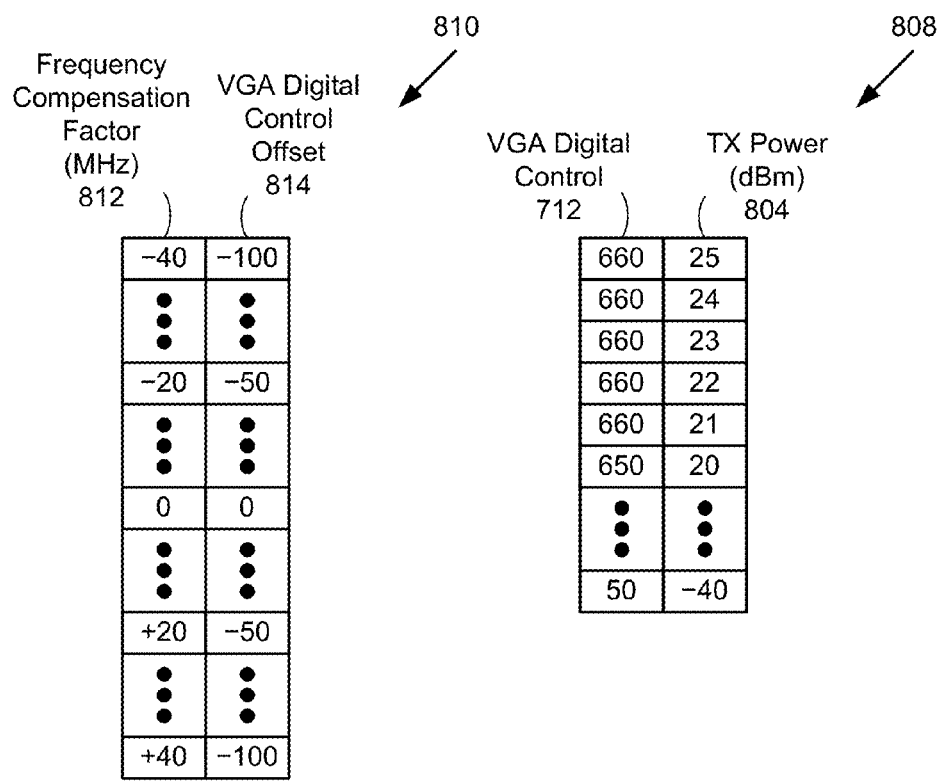

As shown in FIG. 8, a relationship between the VGA digital control 712 and TX power levels 804 of the radiated wireless transmit signals generated from the PA signal output 724 can be represented as a graph 802 or a table 806. Each value of the VGA DAC control 712 (expressed as an integer value) can correspond to a TX power level 804 (expressed in dBm). While table 806 illustrates a linear relationship between the VGA digital control 712 and the TX power 604, a non-linear relationship can also be represented by the table using a different set of values. Specific values in the table 806 can be determined for hardware in a particular mobile wireless communication device by measuring characteristics of the AFE 700 during manufacturing. Measurements can be taken using a fixed transmit carrier frequency in the middle of a transmit frequency band, such as at 1960 MHz for a transmit frequency band that extends from 1920 MHz to 2000 MHz, and at a nominal component temperature value. The measurement values can be stored in a non-volatile random access memory (NV-RAM) for later retrieval. As the gain characteristics of the AFE 700 can vary with transmit carrier frequency and component temperatures, additional tables can be determined and stored that provide an offset from the nominal operating characteristic values determined for table 806.

Compensation tables can be used to vary the transmit power at different points of the transmit frequency band compared with the center of the frequency band. Table 810 contains a set of VGA digital control offset 814 values for different frequency compensation factor 812 values. The frequency compensation values are given as a difference from the carrier frequency at the middle of the transmit frequency band (expressed in MHz), although absolute values or other representations could also be used. For a transmit frequency of 1920 MHz (−40 MHz from the mid-band), the VGA digital control offset 814 value of −100 can lower the actual transmit power level by 10 dB. A requested TX power level 704 of 24 dB that would use a VGA digital control value of 690 from table 806 for a mid-channel transmit carrier frequency at 1960 MHz can be adjusted by the calculation unit 702 to 590 (690−100) using the VGA digital control offset 814 for a band edge carrier frequency or 1920 MHz or 2000 MHz from table 810.

Similar offset compensation tables can be determined for temperature variations from the temperature used to characterize table 806 during manufacturing that account for actual operating conditions of the mobile wireless communication device. For example, if the transmit PA 720 would output a higher transmit power at a particular operating temperature, a table can include an offset value by which to adjust the VGA digital control 712 value so that a desired transmit power level can be realized. Offsets for temperature compensation and frequency compensation can be calculated independently and combined by the calculation unit 702.

Wireless interference from a wireless cellular transceiver into a wireless non-cellular transceiver co-located in the same mobile wireless communication device can be reduced by lowering the transmit power of the wireless cellular transceiver. By lowering the transmit power level by up to 3 dB, when permitted by the wireless cellular communication protocol used by the wireless cellular transceiver, the performance and working distance of the wireless non-cellular transceiver to a networking subsystem to which it connects can be substantially improved. Reducing interference by even 1.0 or 2.0 dB can change the effective operating range of the wireless non-cellular transceiver. The GSM communication protocol allows transmit power levels to vary by +3.0 dB to −3.0 dB from a nominal transmit power level. The UMTS communication protocol allows transmit power levels to vary by +1.5 dB to −3.0 dB from a maximum transmit power level. Based on an estimate of the amount of interference into the wireless non-cellular transceiver that the wireless cellular transceiver can generate at a particular transmit power level, the actual transmit power level of the wireless cellular transceiver can be adjusted downward to reduce the interference. One method to cap the highest transmit power level of a transmit PA 720 is illustrated by table 808, where values of the VGA digital control do not exceed 660. With the values shown in table 808, an actual transmit power level of 21 dBm can be output by the transmit PA 720 when the requested transmit power level is in the range of 21 dBm to 25 dBm. Table 808 can be used in place of table 806 by calculation unit 702 to effect a transmit power reduction for "high" value requested transmit power levels, thereby reducing interference between the wireless cellular transceiver and the wireless non-cellular transceiver.

Figure 9:
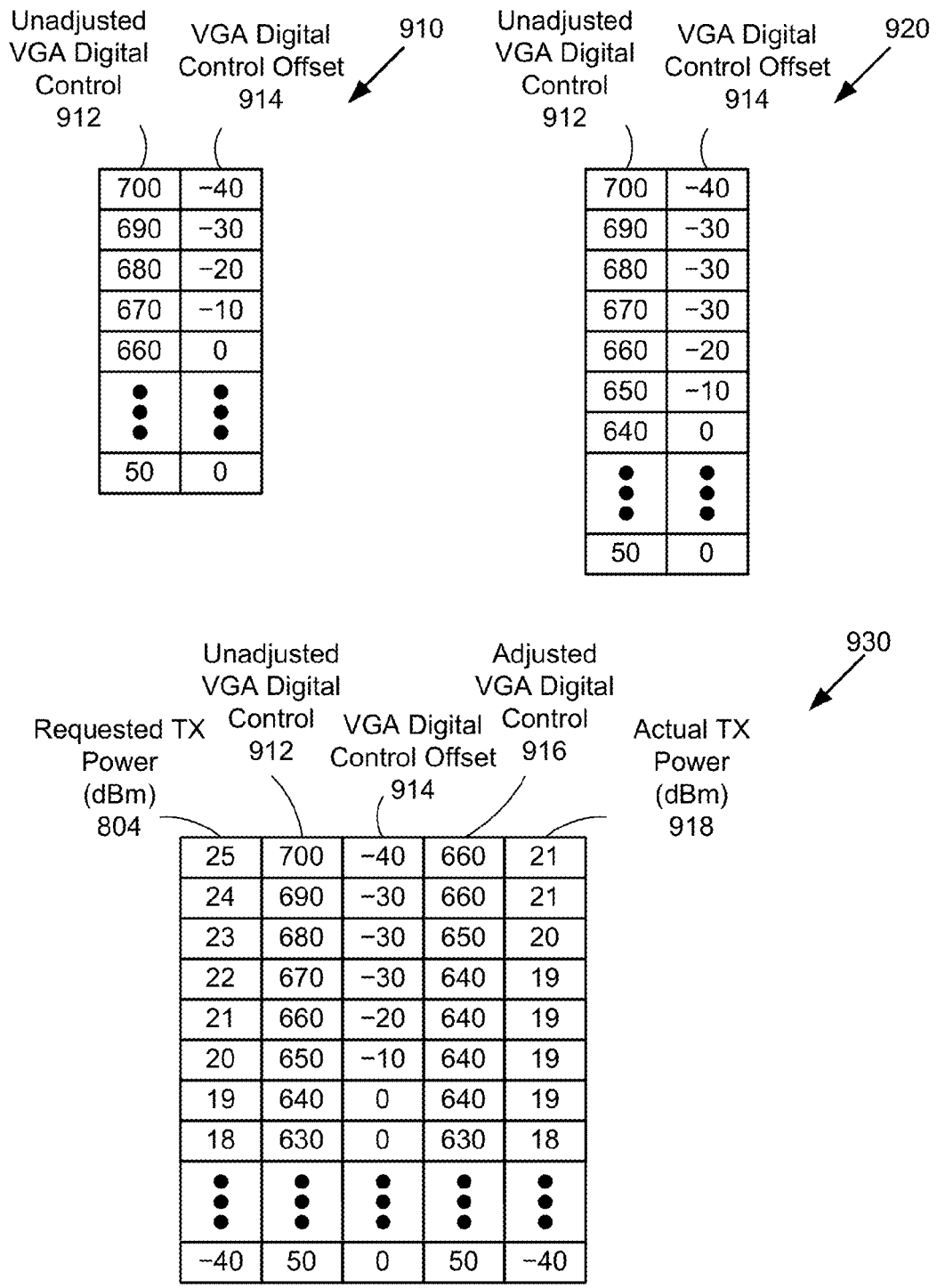

Adjusted actual transmit power levels, as illustrated in table 808, can also be realized by a table of offset values, as illustrated in table 910 in FIG. 9. A requested transmit power level can be used to look up a VGA digital control 712 value in table 806. The VGA digital control 712 value can then be used as an unadjusted VGA digital control 912 value in table 910 to determine a VGA digital control offset 914 value. Combining the unadjusted VGA digital control 912 value with the VGA digital control offset 914 can result in the same lowered transmit power level as shown by table 808. The values in table 808 and table 910 provide a method to cap an actual transmit power level to a maximum value below the requested transmit power level. By populating different sets of values in an offset table, as shown in table 920, actual transmit power levels can vary for different requested transmit power levels as desired. As a representative example, using the values shown in table 920 in combination with the values in table 806 can limit the actual transmit power level to 19 dBm or less (adjusted VGA digital control values of 640 or less) for requested transmit power levels up to 22 dBm (unadjusted VGA digital control values up to 670) as summarized in table 930. Actual transmit power levels can then increase linearly to a maximum of 21 dBm for higher requested transmit power levels. Other values for the VGA digital control offset 914 than those given in Table 920 can result in different values for the actual transmit power 918 in Table 930. The specific values shown in Tables 920 and 930 should not be taken as limiting the flexibility offered by the method disclosed herein to adjust the actual transmit power. A table of offset values to compensate for wireless interference can also be used in combination with tables of offset values for temperature and frequency variation. The offset values to compensate for different operating conditions and preferred transmit power levels (to reduce interference) can be added together to determine a total offset value to be applied to the VGA digital control 712 to set the transmit power level of the PA signal output 724. The actual VGA digital control offset values associated with different VGA digital control values (DAC input values) for Tables 910, 920 and 930 can be based on a characterization and statistical analysis of a representative set of AFEs having a certain sample size. Thus, while Table 806 can be characterized individually for each AFE, Tables 910, 920 and 930 can be determined for a set of AFEs.

Returning to FIG. 7, a transmit power detection module 728 can monitor the transmit PA signal output 724 power level and provide feedback to the calculation unit 702. This feedback can be used in combination with the other compensation parameters described above. Such a feedback loop can account for actual transmit power levels that differ from those calculated by the characterization table and operational compensation parameters. When wireless coexistence compensation 706 is not used, the feedback loop can be used to adjust for a lower PA transmit power level by detecting the lower power and changing values for one of the operational compensation parameters 708 used in the calculation unit 702. This change can result in different VGA digital/analog control 712/714 values thereby boosting the PA signal input 718 and therefore also boosting the PA signal output 724 produced by the PA 720. When wireless coexistence compensation 706 is used, however, the power detection feedback loop could attempt to override and drive higher a purposefully lower (i.e. to reduce interference) transmit power level of the PA signal output 724. The calculation unit 702 can counter this override by using a table with capped VGA digital control 712 values as shown in table 808 of FIG. 8. The highest VGA digital control 712 value of 660 can limit the actual TX power 804 level to 21 dBm or less, particularly if all VGA digital control offset values are zero or negative. Alternatively the calculation unit 702 can include compensation parameter values from the power detection only when the requested TX power 704 is below a certain value and ignore the power detection compensation for higher requested TX power 704 values, thereby limiting the power detection compensation to a range of requested TX power 704 values.

Figure 10:
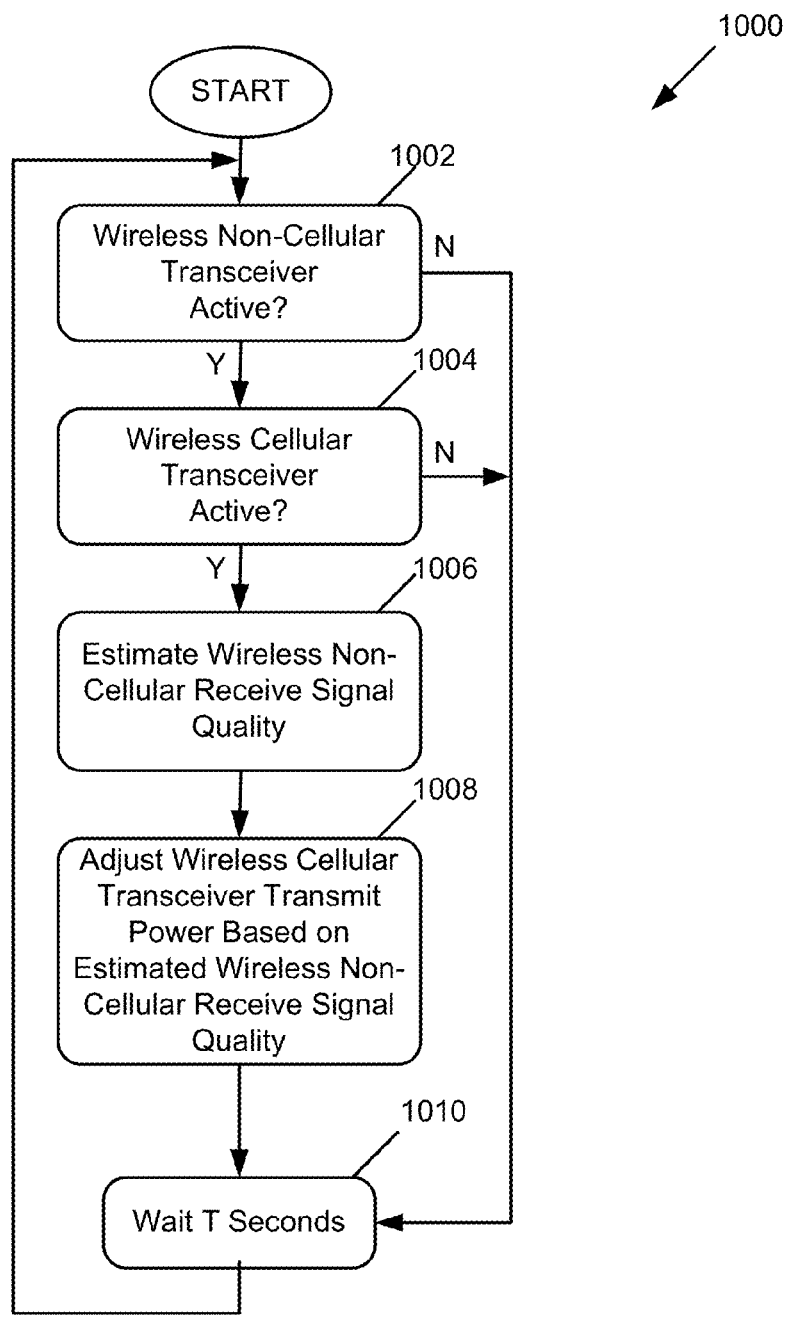
FIG. 10 illustrates a representative method to mitigate interference between a wireless cellular transmitter and a wireless receiver in a mobile wireless communication device using transmit power control.

FIG. 10 illustrates a representative method 1000 for adjusting a wireless cellular transceiver's transmit power level to mitigate interference into a co-located wireless non-cellular transceiver in a mobile wireless communication device. In step 1002, the mobile wireless communication device can detect when a wireless non-cellular transceiver is active. Representative wireless non-cellular transceivers can include wireless local area network (WLAN) and Bluetooth (BT) transceivers. An "active" transceiver can be monitoring wireless signals in order to establish a connection or can be actively transmitting and receiving wireless signals through a connection. When the wireless non-cellular transceiver is active, then in step 1004, the mobile wireless communication device can detect when a wireless cellular transceiver is also active. If either the wireless non-cellular transceiver or the wireless cellular transceiver is not active, then the mobile wireless communication device can wait a settable period of T seconds in step 1010, before determining again whether the transceivers are active. The cycle time to repeat the estimating and adjusting loop can vary based on the powered state (battery or AC) of the mobile wireless communication device and on the amount of available reserve energy stored in the battery. Lower available battery power can lengthen the loop (increased T values) to lower computational cycles and reduce power consumption.

If both the wireless non-cellular transceiver and the wireless cellular transceiver are active, then a receive signal quality of the wireless non-cellular transceiver can be estimated in step 1006. The receive signal quality estimation can account for physical properties of the mobile wireless communication device such as the amount of radio frequency antenna isolation between the co-located wireless transceivers. The estimation can also account for "hard" properties of the wireless non-cellular transceiver, such as its sensitivity requirements and noise floor, as well as "soft" properties of the wireless non-cellular connection, such as a quality of service mode. More sensitive components and higher quality of service connections can require lower interference levels to achieve a desired performance level for the wireless non-cellular connection. Estimation of non-cellular receive signal quality can also account for transmission characteristics of the wireless cellular transceiver, such as a transmit carrier frequency and modulation type that can affect the amount of interference into the wireless non-cellular transceiver.

In step 1008, the actual transmit power of the wireless cellular transceiver can be adjusted based on the estimated wireless non-cellular receive signal quality. High transmit power levels of the wireless cellular transceiver can be capped to lower levels to limit interference. Adjustments to the transmit power level of the wireless cellular transceiver can be constrained by ranges allowed by a communication protocol used by the wireless cellular transceiver.

Figure 11:
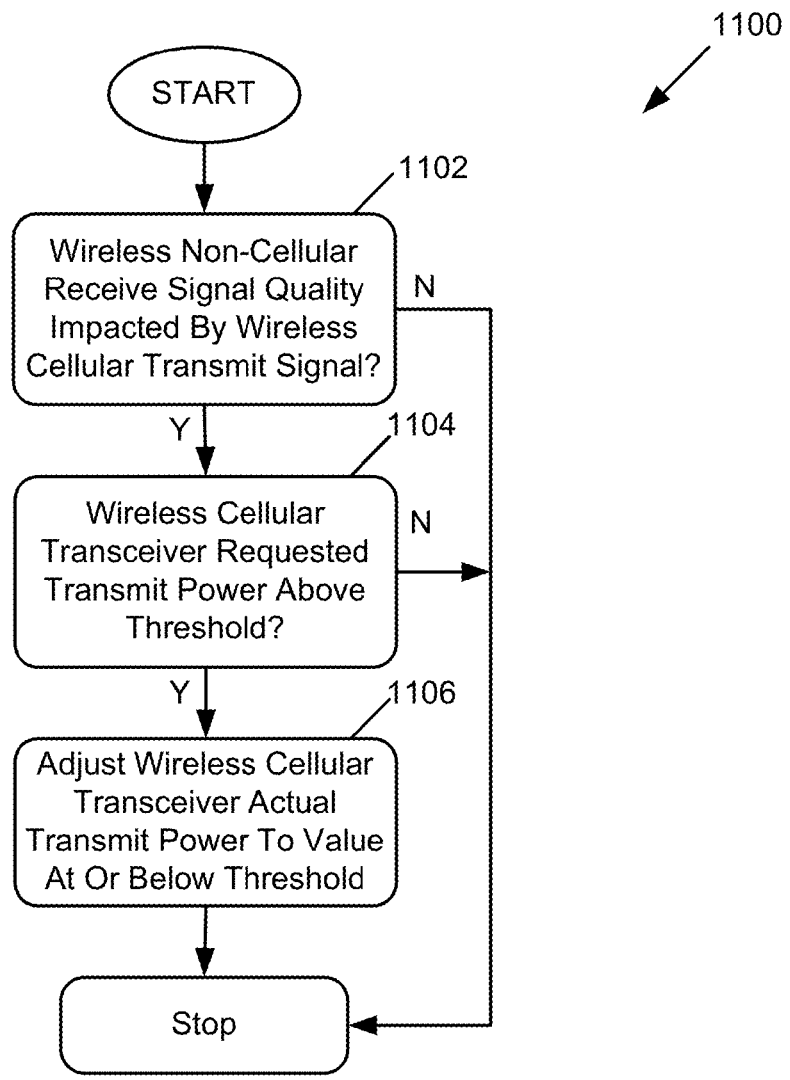
FIG. 11 illustrates a representative method for adjusting transmit power control.

FIG. 11 expands on the adjusting step 1008 of FIG. 10. Using the wireless non-cellular receive signal quality estimated in step 1006, the mobile wireless communication device can determine in step 1102 whether the signal quality is impacted by the wireless cellular transmit signal. If the wireless cellular transmit signal impacts the wireless non-cellular receive signal quality, then in step 1104, the mobile wireless communication device can determine if the requested transmit power for the wireless cellular transceiver exceeds a threshold. The threshold can ensure the actual transmit signal power is lowered only for requested transmit signal levels at or near a maximum transmit signal level in order to ensure the wireless cellular transmit signal power level remains within a range required by the wireless cellular communication protocol used. When the threshold is exceeded, in step 1008, an adjustment to the wireless cellular transceiver actual transmit power can be determined using the estimated wireless non-cellular signal quality. A level of adjustment to the wireless cellular transmit power level can be matched to the extent of impact on the wireless non-cellular receive signal quality. Matching the transmit power level adjustment can ensure a balance between lowering interference into the wireless non-cellular connection while retaining adequate performance through wireless cellular connection.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of mitigating interference in an active mobile wireless communication device including a wireless cellular transceiver and a wireless non-cellular transceiver co-located in the mobile wireless communication device, the method comprising:

estimating a receive signal quality for the wireless non-cellular transceiver that includes interference from signals transmitted by the wireless cellular transceiver;

adjusting an actual transmit power of the wireless cellular transceiver based on the estimated receive signal quality, wherein adjusting the actual transmit power of the wireless cellular transceiver comprises:

determining an unadjusted digital gain setting for a variable gain transmit amplifier in the wireless cellular transceiver based on one or more messages received through a downlink of the wireless cellular connection, determining a digital gain adjustment value based on the estimated receive signal quality, generating an adjusted digital gain setting for the variable gain transmit amplifier by combining the unadjusted digital gain setting and the digital gain adjustment value, and setting a gain of the variable gain transmit amplifier using the adjusted digital gain setting; and repeating periodically the estimating and adjusting;

wherein the actual transmit power of the wireless cellular transceiver is less than a requested transmit power for the wireless cellular transceiver.

2. The method as recited in claim 1, wherein a periodicity of the repeating depends on the method by which the mobile wireless communication device is powered and the amount of stored power available in the mobile wireless communication device.

3. The method as recited in claim 1, wherein a primary transmit frequency band of the wireless cellular transceiver and a primary receive frequency band of the wireless non-cellular transceiver do not overlap; and higher order harmonics of signals transmitted in the primary transmit frequency band of the wireless cellular transceiver overlap at least a portion of the primary receive frequency band of the wireless non-cellular transceiver.

4. The method as recited in claim 1, wherein estimating the receive signal quality for the wireless non-cellular transceiver depends on the requested transmit power of signals transmitted by the wireless cellular transceiver, an amount of radio frequency antenna isolation between the wireless cellular transceiver and the wireless non-cellular transceiver, and a receiver sensitivity requirement of the wireless non-cellular transceiver.

5. The method as recited in claim 4, wherein estimating the receive signal quality for the wireless non-cellular transceiver further depends on the modulation type of the wireless cellular connection.

6. The method as recited in claim 1 wherein estimating the receive signal quality for the wireless non-cellular transceiver depends on a connection state of the wireless non-cellular transceiver, and a quality of service mode of connections through the wireless non-cellular transceiver.

7. A mobile wireless communication device, comprising:

a first transceiver that receives signals through a wireless non-cellular connection;

a second transceiver that transmits signals through a wireless cellular connection; and a control processor coupled to the first and second transceivers, wherein the control processor mitigates interference in the mobile wireless communication device by:

estimating a performance impact to signals received by the first transceiver from signals transmitted by the second transceiver;

adjusting an actual transmit power of the second transceiver based on the performance impact estimation; and repeating periodically the estimating and adjusting while both the wireless non-cellular and wireless cellular connections are active;

wherein the actual transmit power of the second transceiver is less than a requested transmit power for an uplink of the wireless cellular connection, wherein adjusting the actual transmit power of the second transceiver based on the performance impact estimation comprises:

determining an unadjusted digital gain setting for a variable gain transmit amplifier in the second transceiver based on one or more messages received through a downlink of the wireless cellular connection, determining a digital gain adjustment value based on the performance impact estimation, generating an adjusted digital gain setting for the variable gain transmit amplifier by combining the unadjusted digital gain setting and the digital gain adjustment value, and setting a gain of the variable gain transmit amplifier using the adjusted digital gain setting.

8. The mobile wireless communication device as recited in claim 7, wherein a periodicity at which the control processor repeats the estimating and adjusting depends on the method by which the mobile wireless communication device is powered and the amount of stored power available in the mobile wireless communication device.

9. The mobile wireless communication device as recited in claim 7, wherein a primary transmit frequency band of the wireless cellular connection used by the second transceiver does not overlap a primary receive frequency band of the wireless non-cellular connection used by the first transceiver, and higher order harmonics of transmissions in the primary transmit frequency band of the wireless cellular connection output by the second transceiver overlap at least a portion of the primary receive frequency band of the wireless non-cellular connection received by the first transceiver.

10. The mobile wireless communication device as recited in claim 7, wherein the control processor estimates the performance impact to signals received by the first transceiver through the wireless non-cellular connection from signals transmitted by the second transceiver through the wireless cellular connection using a requested transmit power level of signals transmitted by the second transceiver, an amount of radio frequency antenna isolation between the first and second transceivers, and a receiver sensitivity requirement of the first transceiver.

11. The mobile wireless communication device as recited in claim 7, wherein the control processor estimates the performance impact to signals received by the first transceiver through the wireless non-cellular connection from signals transmitted by the second transceiver through the wireless cellular connection using a connection state of the first transceiver, and a quality of service mode of the wireless non-cellular connection.

12. Non-transitory computer readable medium for storing computer program code executable by a processor for mitigating interference in a mobile wireless communication device comprising:

computer program code for estimating a performance impact to signals received by a first transceiver of the mobile wireless communication device through a wireless non-cellular connection from signals transmitted by a second transceiver of the mobile wireless communication device through a wireless cellular connection;

computer program code for adjusting an actual transmit power of the second transceiver based on the performance impact estimation; and computer program code for periodically repeating the estimating and adjusting while the wireless non-cellular and wireless cellular connections are active;

wherein the actual transmit power of the second transceiver is less than a requested transmit power for an uplink of the wireless cellular connection, wherein adjusting the actual transmit power of the second transceiver based on the performance impact estimation comprises:

determining an unadjusted digital gain setting for a variable gain transmit amplifier in the second transceiver based on one or more messages received through a downlink of the wireless cellular connection, determining a digital gain adjustment value based on the performance impact estimation, generating an adjusted digital gain setting for the variable gain transmit amplifier by combining the unadjusted digital gain setting and the digital gain adjustment value, and setting a gain of the variable gain transmit amplifier using the adjusted digital gain setting.

13. The non-transitory computer readable medium as recited in claim 12 further comprising:

computer program code for estimating an amount of interference received by the first transceiver from the signals transmitted by the second transceiver over the wireless cellular connection based on a power level and modulation type of the signals transmitted by the second transceiver over the wireless cellular connection, and an amount of radio frequency antenna isolation between the first and second transceivers; and computer program code for estimating the performance impact of the interference based on a receiver sensitivity requirement of the first transceiver.

14. The non-transitory computer readable medium as recited in claim 12, wherein estimating the performance impact to signals received by the first transceiver through the wireless non-cellular connection is based on a connection state of the wireless non-cellular connection, and a quality of service mode of the wireless non-cellular connection.

15. An apparatus for adjusting transmit signals output by a cellular transceiver in a mobile wireless communication device, the apparatus comprising:

means for estimating a performance impact to signals received by a non-cellular transceiver of the mobile wireless communication device from signals transmitted by the cellular transceiver;

means for determining a requested transmit power level for the transmit signals output by the cellular transceiver, the requested transmit power level at least partially based on messages received from a network subsystem to which the cellular transceiver connects;

means for adjusting an actual transmit power level of the transmit signals to a value different than the requested transmit power level when the performance impact to signals received by the non-cellular transceiver exceeds a first threshold; and means for repeating the estimating, determining and adjusting periodically while the cellular and non-cellular transceivers are active, wherein means for adjusting the actual transmit power level of the transmit signals to a value different than the requested transmit power level when the performance impact to signals received by the non-cellular transceiver exceeds the threshold comprises:

means for determining an unadjusted digital gain setting for a variable gain transmit amplifier in the cellular transceiver based on the requested transmit power level, means for determining a digital gain adjustment value based on the performance impact estimation, means for generating an adjusted digital gain setting for the variable gain transmit amplifier by combining the unadjusted digital gain setting and the digital gain adjustment value, and means for setting a gain of the variable gain transmit amplifier using the adjusted digital gain setting.

16. The apparatus as recited in claim 15, wherein a periodicity of the repeating depends on the method by which the mobile wireless communication device is powered and the amount of stored power available in the mobile wireless communication device.

17. The apparatus as recited in claim 15 further comprising:

means for determining a transmit frequency for the transmit signals;

means for determining the actual transmit power level of the transmit signals;

means for determining an operating temperature of the cellular transceiver; and means for adjusting the actual transmit power level based on an operational compensation value calculated using the determined transmit frequency, actual transmit power level and operating temperature.

* * * * *